United States Patent
Luo et al.

(10) Patent No.: US 9,980,091 B2
(45) Date of Patent: May 22, 2018

(54) LOCATION INFORMATION PROCESSING METHOD AND ELECTRONIC DEVICE

(71) Applicant: Lenovo (Beijing) Limited, Beijing (CN)

(72) Inventors: Yingwen Luo, Beijing (CN); Hongxing Chen, Beijing (CN); Yaqiang Wu, Beijing (CN); Pengyu Li, Beijing (CN); Xiaomei Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days. days.

(21) Appl. No.: 15/282,067

(22) Filed: Sep. 30, 2016

(65) Prior Publication Data
US 2017/0171712 A1    Jun. 15, 2017

(30) Foreign Application Priority Data
Dec. 14, 2015  (CN) .......................... 2015 1 0926604

(51) Int. Cl.
*H04W 24/00* (2009.01)
*H04W 4/02* (2018.01)
*H04W 52/02* (2009.01)

(52) U.S. Cl.
CPC .......... *H04W 4/023* (2013.01); *H04W 4/028* (2013.01); *H04W 52/0277* (2013.01)

(58) Field of Classification Search
CPC . H04W 4/023; H04W 4/028; H04W 52/0277; H04W 4/008; H04W 24/00; H04W 4/04; H04W 52/02; G01S 5/02; G01S 5/0236; G01S 5/14; G01S 3/02;
(Continued)

(56) References Cited

U.S. PATENT DOCUMENTS

| | | | | |
|---|---|---|---|---|
| 7,925,426 B2 * | 4/2011 | Koebler | ..................... | B60L 3/12 180/65.26 |
| 8,526,906 B1 * | 9/2013 | Oroskar | ............ | H04W 52/0277 455/343.1 |
| 9,123,086 B1 * | 9/2015 | Freeland | ................... | G06T 1/00 |

(Continued)

FOREIGN PATENT DOCUMENTS

| CN | 101383622 A | | 3/2009 |
|---|---|---|---|
| CN | 102088658 A | * | 6/2011 |

(Continued)

*Primary Examiner* — Mahendra Patel
(74) *Attorney, Agent, or Firm* — Ference & Associates LLC (57) ABSTRACT

An embodiment provides a method, including: a first electronic device receiving a location signal through a communication module of the first electronic device; the first electronic device storing information of said location signal; the first electronic device transmitting the information of said location signal to a second electronic device in communication with the first electronic device, so that the second electronic device can derive a location of the first electronic device based on the information of said location signal; the first electronic device receiving from the second electronic device, information comprising said location of the first electronic device, via the communication module of the first electronic device; and the first electronic device displaying said location of the first electronic device. Other embodiments are described and claimed.

14 Claims, 5 Drawing Sheets

(58) Field of Classification Search
CPC ... G01S 19/34; H04B 5/0037; H04L 61/6022; A61B 5/0044; G04C 5/008
USPC .......................... 455/456.6; 323/283; 307/31
See application file for complete search history.

(56) References Cited

U.S. PATENT DOCUMENTS

| | | | | |
|---|---|---|---|---|
| 2001/0036810 | A1* | 11/2001 | Larsen ................. | H04B 7/2606 455/11.1 |
| 2006/0125693 | A1* | 6/2006 | Recker ..................... | G01S 5/14 342/458 |
| 2007/0022446 | A1* | 1/2007 | Arseneau .............. | G06F 1/1626 725/74 |
| 2010/0306057 | A1* | 12/2010 | Haumont ............... | G06Q 30/02 705/14.55 |
| 2011/0268000 | A1* | 11/2011 | Kashikar ............... | G06F 1/3203 370/311 |
| 2013/0078968 | A1* | 3/2013 | Breed ................... | H04W 4/008 455/414.1 |
| 2013/0281154 | A1* | 10/2013 | Aerrabotu ............. | H04B 1/406 455/553.1 |
| 2014/0259189 | A1* | 9/2014 | Ramachandran ..... | H04W 4/023 726/30 |
| 2015/0077127 | A1* | 3/2015 | Fu ......................... | G06F 1/3212 324/428 |
| 2015/0237584 | A1* | 8/2015 | Royston ............ | H04W 52/0264 455/41.1 |
| 2015/0289111 | A1* | 10/2015 | Ozkan ..................... | H04W 4/04 455/456.1 |
| 2015/0301587 | A1* | 10/2015 | Chae ..................... | G06F 1/3265 713/323 |

FOREIGN PATENT DOCUMENTS

| | | | | |
|---|---|---|---|---|
| CN | 102565824 | A | * | 7/2012 |
| CN | 102955161 | A | * | 3/2013 |
| CN | 103185886 | A | | 7/2013 |
| CN | 103323866 | A | | 9/2013 |
| CN | 103852773 | A | | 6/2014 |
| CN | 104698477 | A | | 6/2015 |
| CN | 105116421 | A | | 12/2015 |
| CN | 105676247 | A | * | 6/2016 |
| JP | 2011043479 | A | | 3/2011 |
| TW | 200722778 | A | | 6/2007 |
| WO | WO 2013174014 | A1 | * | 11/2013 |
| WO | WO 2013177436 | A1 | * | 11/2013 ............ H04W 4/001 |

* cited by examiner

LOCATION INFORMATION PROCESSING METHOD AND ELECTRONIC DEVICE

CLAIM FOR PRIORITY

This application claims priority to Chinese Application No. 201510926604.3, filed on Dec. 14, 2015, the contents of which are fully incorporated by reference herein.

FIELD

The subject matter relates to the field of electronic technologies, and in particular, to an information processing method and an electronic device.

BACKGROUND

With the continuous development of science and technology, various electronic devices such as smart phones, smart watches, and smart bands frequently appear on the market, and enrich people's lives.

Conventionally, in order to record the movement trajectory of an electronic device user during his or her movement, the user typically downloads and installs some motion software, which first receives GPS (Global Positioning System) signals through a GPS receiver in the electronic device, then processes the received GPS signals with calculation to obtain the positional information of the user, and lastly draws the movement trajectory of the user generated during his or her movement based on the obtained positional information. In this operation processing sequence, the operations, from obtaining the GPS signals, processing the GPS signals, to lastly obtain the movement trajectory, are all performed by an electronic device terminal, which results in the power of the electronic device being rapidly consumed.

As a result, higher power consumption arises when an electronic device is acquiring movement trajectory.

BRIEF SUMMARY

In summary, a first aspect provides a method, comprising: a first electronic device receiving a location signal through a communication module of the first electronic device; the first electronic device storing information of said location signal; the first electronic device transmitting the information of said location signal to a second electronic device in communication with the first electronic device, so that the second electronic device can derive a location of the first electronic device based on the information of said location signal; the first electronic device receiving from the second electronic device, information comprising said location of the first electronic device, via the communication module of the first electronic device; and the first electronic device displaying said location of the first electronic device.

A second aspect provides an electronic device, comprising: a housing; a display device disposed within the housing; a communication module disposed within the housing; a processor operatively coupled to the display device and the communication module; and a memory that stores instructions executable by the processor to: receive a location signal through the communication module; store information of said location signal; transmit the information to a second electronic device; receive from the second electronic device, information comprising said location of the first electronic device via the communication module; and display said location of the first electronic device via the display device.

A third aspect provides an electronic device, comprising: a processor; and a memory that stores instructions executable by the processor to: receive positioning data from a mobile device; process the positioning data to resolve a location of the mobile device; and transmit, to the mobile device, information comprising said location of the mobile device.

The foregoing is a summary and thus may contain simplifications, generalizations, and omissions of detail; consequently, those skilled in the art will appreciate that the summary is illustrative only and is not intended to be in any way limiting.

For a better understanding of embodiments, together with other and further features and advantages thereof, reference is made to the following description, taken in conjunction with the accompanying drawings, and the scope of the invention will be pointed out in the appended claims.

DETAILED DESCRIPTION

It will be readily understood that the components of the embodiments, as generally described and illustrated in the figures herein, may be arranged and designed in a wide variety of different configurations. Thus, the following more detailed description of the embodiments of the apparatus, system, and method, as represented in FIGS. 1 through 5 is not intended to limit the scope of the embodiments, as claimed, but is merely representative of selected embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

An information processing method and electronic device are described in order to solve a technical problem of higher power consumption of an electronic device while acquiring movement trajectory, thereby to achieve the technical effect of decreasing power consumption of the electronic device while acquiring movement trajectory.

An information processing method in accordance with an embodiment includes: receiving a location signal through a first communication module of a first electronic device; storing related information of the location signal; and transmitting the related information to a second electronic device in communication with the first electronic device through a second communication module of the first electronic device.

A technical solution of the embodiments includes a location signal may be received through the first communication module of the first electronic device; related information of the location signal may be stored; and the related information may be transmitted to a second electronic device in communication with the first electronic device through a second communication module of the first electronic device. This is different from prior techniques in which the operation sequence of the electronic device is receiving location signals, processing the received location signals to acquire the positional information, and at last obtaining the movement trajectory of the electronic device, which are performed by the electronic device. This results in the power of the electronic device being rapidly consumed. However, in an embodiment, subsequent to receiving the location signal, the electronic device transmits related information of the location signal to a second electronic device for processing, thereby effectively solving the technical problem of higher power consumption of the electronic device while acquiring movement trajectory, and achieving the technical effect of decreasing power consumption of the electronic device while acquiring movement trajectory.

Embodiment 1

Embodiment 1 provides an information processing method that may be applied to a first electronic device. The first electronic device may be a smart watch, a smart phone, a computer, a tablet computer, a sports tracker and the like that is provided with a positioning system, and may also be another electronic device, but shall not be individually enumerated herein.

Figure 1:
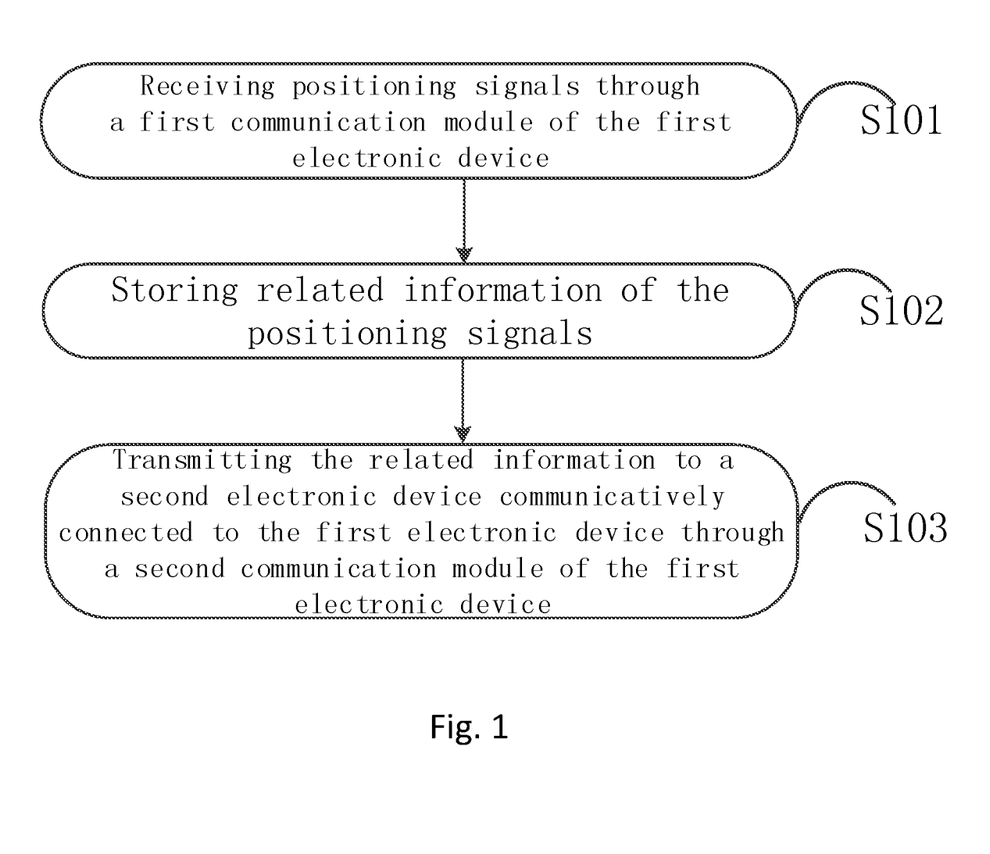
FIG. 1 is a flow diagram of an example information processing method according to an embodiment.

Referring to FIG. 1, an embodiment provides an information processing method applicable to a first electronic device, which comprises, at S101, receiving one or more location signals through a first communication module of the first electronic device. At S102, an embodiment stores related information of the location signals. At S103, the related information is transmitted to a second electronic device in communication with the first electronic device through a second communication module of the first electronic device.

Figure 2:
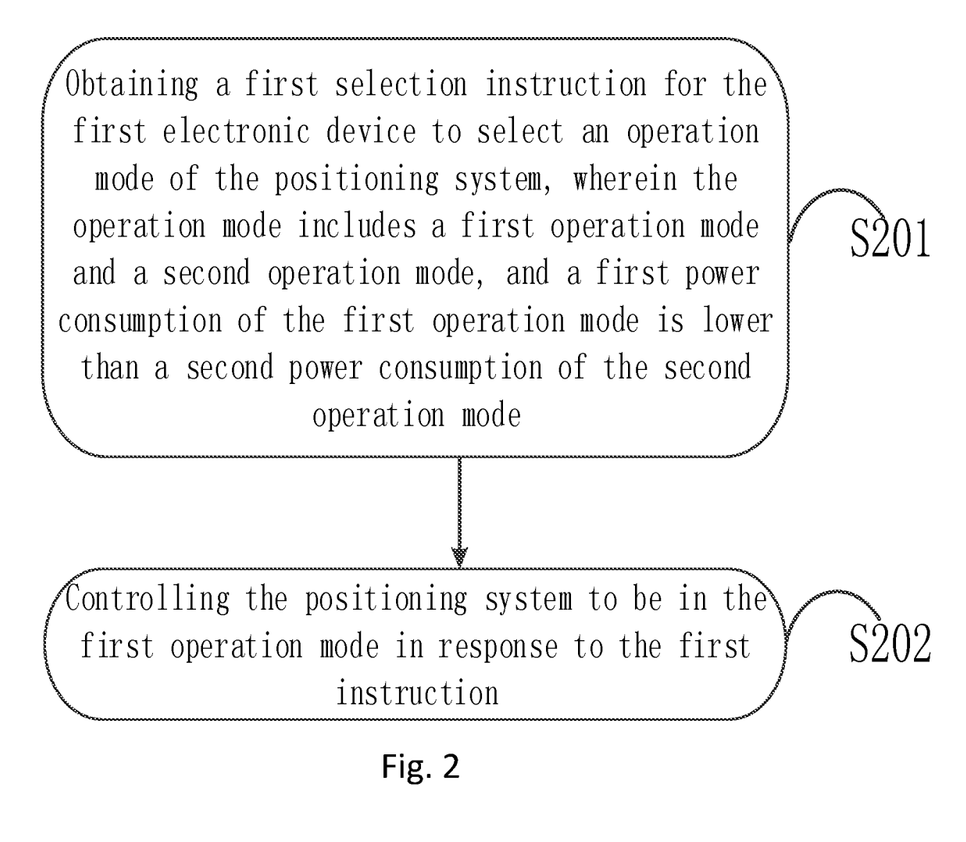
FIG. 2 is a flow diagram of an example information processing method according to an embodiment.

Referring to FIG. 2, prior to performing step S101, the following steps may be performed. At S201 a first selection instruction for the first electronic device to select an operation mode of the positioning system is obtained, wherein the operation mode may include a first operation mode and a second operation mode, and a first power consumption of the first operation mode may be lower than a second power consumption of the second operation mode.

At S202 the positioning system is controlled to be in the first operation mode responsive to the first instruction. Step S201 may be performed first.

The operation modes of the positioning system may include a first operation mode and a second operation mode. The operation mode of the positioning system may be selected through a mode selection unit. The mode selection unit may be a mechanical selection switch with two selection positions: first selection position and second selection position, which may be selected by the user through up-down or right-left toggling between these two selection positions to determine the corresponding first or second operation mode. The mode selection unit may also be a touch unit on the display unit of the first electronic device, wherein the user selects the operation mode of the positioning system with touch operation, either the first operation mode or the second operation mode. Both of these implementations may be used, and those skilled in the art may select one of these two implementations as desired, however, no specific limitation thereon is defined in the embodiments of the present application. In a specific implementation, the first selection instruction may also be generated automatically by a predetermined application to control the positioning system to be in the first operation mode. For example, after being launched, a motion monitoring application may generate the first selection instruction to control the positioning system to be in the first operation mode.

The second electronic device may be a smart phone, a laptop computer, a desktop computer or server and the like that is in communication with the first electronic device, and may also be another electronic device. No specific limitation thereon is defined in the embodiments.

The first operation mode may be the operation mode in which after the location signal is received by the first communication module of the positioning system of the first electronic device, related information of the location signal is transmitted to a second electronic device in communication with the first electronic device and the second electronic device processes the received related information. The second operation mode may be the operation mode in which, after the location signal is received by the first communication module of the positioning system of the first electronic device, the first electronic device itself processes the received signal. In the second operation mode, the first electronic device may consume more power than in the first operation mode because it needs to perform subsequent processing on the received signal. Therefore, the first power consumption of the first operation mode is lower than the second power consumption of the second operation mode. In a non-limiting example, when the first power consumption of the first operation mode is 100 W, the second power consumption of the second operation mode may be higher than the first power consumption, such as 150 W or 160 W or even more.

After step S201 is performed, step S202 is performed, i.e., controlling the positioning system to be in the first operation mode in response to the first instruction. Step S202 may comprise the following steps: acquiring a remaining battery power value of the first electronic device; and determining whether the remaining battery power value is lower than a preset power value to obtain a first determination result. If the first determination result is positive, the positioning system is controlled to be in the first operation mode.

Although the user may select the operation mode of the positioning system of the first electronic device through the mode selection unit, during the actual operation, the first electronic device may finally determine the actual operation mode of the positioning system of the first electronic device based on the actual remaining battery power of the electronic device.

When the user selects the second operation mode for the positioning system through the mode selection unit, before determining the final operation mode, the first electronic device may acquire the remaining battery power of the first electronic device from a battery management unit, such as 30% remaining, and then may determine whether the remaining battery power is lower than a preset power value, for example 40%. Since the actual acquired remaining battery power is 30%, which is lower than 40%, the positioning system may not be controlled to be in the second operation mode, instead it is controlled to be in the first operation mode for better power saving, thereby to ensure the stand-by time of the first electronic device. The reason for this configuration is that, although the user may want to operate the positioning system in the second operation mode in which the first electronic device will consume more power, such as 50% of the total battery power of the first electronic device, in this case of the positioning system being placed in the second operation mode, it is quite possible for the first electronic device to automatically power down because of low battery power even before the second electronic device completes its processing on the received location signals, which will provide a poor user experience. Therefore, with a technical solution of the embodiments is that, even when the battery power of the first electronic device is low, the data processing may be completed, which provides a better user experience.

The first communication module may receive the location signals in real time and it may also receive the location signals at a preset time interval. The preset time interval may be 2 ms, 3 ms or 4 ms; and those skilled in the art may set the time interval as desired, thus no specific limitation thereon is defined in the embodiments. The first electronic device may receive the signals at a certain time interval, that is, after having received the location signals for a time period, the electronic device may sleep for a time period, during which the device consumes less power, consequently the stand-by time of the first electronic device may be extended, thereby providing a better user experience.

After step S101 is performed, step S102 may be performed. Since all location signals of the first electronic device during the movement are to be received, every piece of related information of all the received location signals will be stored correspondingly. Since all GPS satellites adopt the same carrier, the received location signal is a composite signal from a plurality of satellites, and after being received, the received location signal needs to be processed to determine the satellite that emitted the location signal and to determine the time difference between the transmission of the location signal and the receipt of the signal by the first electronic device.

When the duration for receiving the signals is different, the information derived from the location signal is also different. For example, when a 30 ms signal is received, the received signal will contain the positional information of the satellite, thus the related information will specifically include the satellite that emitted the location signal, the time difference, and the positional information of the satellite. When a 2 ms signal is received, the received location signal may not contain the positional information of the satellite because the duration for transmitting the signal containing the satellite position is long, and the receiver needs to be in the receiving state for a long time. Therefore, when the receiving time is short, the received signal may not contain the positional information of the satellite. Thus, the related information may also be the satellite that emitted the location signal, and the time difference.

After the first electronic device receives the location signal through the first communication module, the first electronic device may demodulate the received location signal to obtain the corresponding digital signal, or the first electronic device may not demodulate the received positional signal, but rather may transmit the received location signal to the second electronic device so that the second electronic device demodulates the location signal. Both implementation manners stated above are applicable, but those skilled in the art may configure as desired. No specific limitation thereon is defined in the embodiments.

After step S102 is performed, step S103 may be performed: i.e., transmitting the related information to a second electronic device in communication with the first electronic device through a second communication module of the first electronic device.

Step S103, may comprise, when acquiring a first parameter indicating that a user of the first electronic device stopped moving, the first electronic device transmits every piece of the related information to a second electronic device in communication with the first electronic device through a second communication module of the first electronic device.

It may be determined based on a first parameter received by the first electronic device when all received related information has been transmitted to the second electronic device. The first parameter may be an operation performed by the user on the first electronic device to indicate the end of the current movement. In one non-limiting example, when starting a movement the user confirms the start of the current movement with the start button on the display unit of the first electronic device, and when ending a movement, the user indicates the end of the current movement with the end button on the display unit. The first parameter may also be the detected acceleration of the first electronic device. When it is detected that the current acceleration of the first electronic device is 0 (zero) and the zero acceleration keeps unchanged for 10 minutes, it is indicated that the user of the first electronic device already ended the current movement.

After the user ends the current movement, all the received related information may be transmitted to the second electronic device. All the related information may be transmitted together to the second electronic device after the user ends the movement. Therefore, the transmission efficiency may be enhanced, the power consumption of the first electronic device may be decreased correspondingly, the stand-by time of the first electronic device may be extended, and a better user experience may be provided.

Embodiment 2

An information processing method may be applied to a second electronic device. The second electronic device may be a desktop computer, a server and the like that is disposed at a network side and possesses some processing capability, and may also be another electronic device, but shall not be individually enumerated herein.

Figure 3:
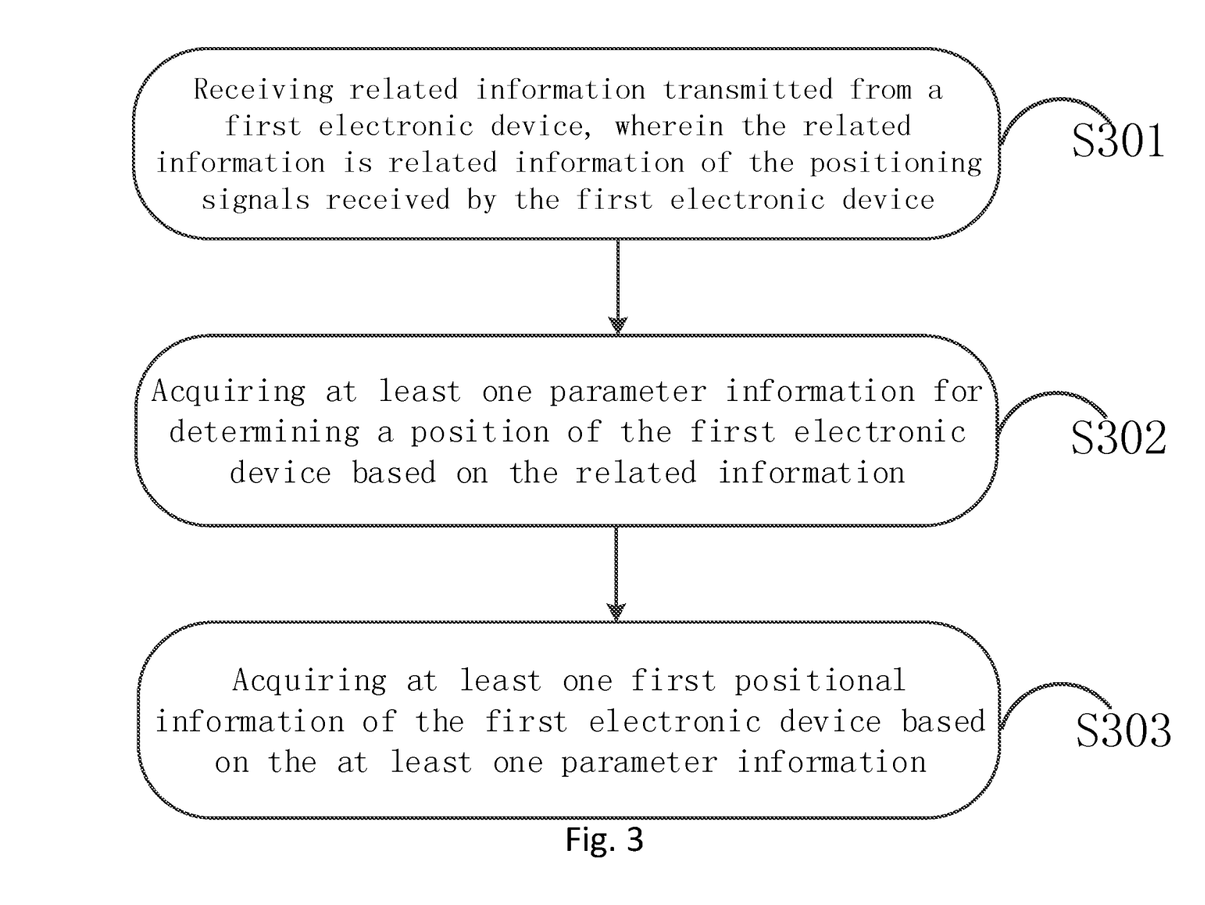
FIG. 3 is a flow diagram of an example information processing method according to an embodiment.

Referring now to FIG. 3, an embodiment provides an information processing method comprising, at S301, receiving related information transmitted from a first electronic device, wherein the related information is related information of the location signals received by the first electronic device. At S302, at least one parameter information for determining a position of the first electronic device based on the related information is acquired. At S303, at least one first positional information of the first electronic device based on the at least one parameter information is acquired.

In the embodiments of the present application, step S301 may be performed first. The first electronic device may be a smart phone, a tablet computer, a laptop computer, a smart band and the like that is provided with a positioning system, and may also be another electronic device. No specific limitation thereon is defined in the embodiments of the present application.

The related information may be location signals received by the first electronic device. In order to decrease the power consumption of the first electronic device, the second electronic device in communication with the first electronic device may process the related information of the location signal received by the first electronic device, and thus the second electronic device needs to receive the related information transmitted by the first electronic device.

After step S301 is performed, step S302 may follow, i.e., acquiring at least one parameter information for determining a position of the first electronic device based on the related information.

When the received related information is different, step S302 may be implemented in different ways. When the received related information contains the positional information of a third electronic device that transmitted the location signal to the first electronic device, step S302 may further comprise parsing the related information to acquire the at least one parameter information.

The at least one parameter information may include: the third electronic device that transmitted the location signal, the positional information of the third electronic device, the time difference between the time point of the third electronic device transmitting the location signal and the time point of the first electronic device received the location signal.

When the received related information does not contain the positional information of a third electronic device that transmitted the location signal to the first electronic device, step S302 may further comprise parsing the related information and acquiring the positional information of the third electronic device from a fourth electronic device, different from the first electronic device, to acquire the at least one parameter information.

When the received related information is parsed, the location signal to the first electronic device, the third electronic device that transmitted the location signal, and the time difference between the time point of the third electronic device transmitting the location signal and the time point of the first electronic device receiving the location signal may be obtained.

In addition to parsing the acquired related information, the positional information of the third electronic device that transmitted the location signal is may be acquired from a fourth electronic device. The third electronic device and the fourth electronic device may be the same, and may also be different. When the third electronic device is different from the fourth electronic device, the third electronic device may be a satellite while the fourth electronic device may be a server associated with the first electronic device that is located at the network side for storing the positional information of the third electronic device.

Since the second electronic device may acquire the positional information of the third electronic device from the fourth electronic device, the first electronic device may not need to receive in real time the location signal transmitted by the third electronic device. Instead, the first electronic device may receive the location signal at a certain time interval, that is, enter the sleep mode after receiving the location signal for a time period. Because the first electronic device consumes less power in the sleep mode, a technical effect is achieved in that the power consumption of the first electronic device is decreased.

After step S302 is performed, step S303 may follow, i.e., acquiring at least one first positional information of the first electronic device based on the at least one parameter information.

After the first electronic device receives the location signal transmitted by the third electronic device, the arrival time of the signal may be measured if the first electronic device is provided with a clock that is precisely synchronized with the clock in the third electronic device, so as to calculate the propagation time of the location signal in the air. The distance between the first electronic device and the third electronic device may be calculated by multiplying this propagation time by the propagation velocity of the signal in the air:

$$S=\sqrt{(x_1-x)^2+(y_1-y)^2+(z_1-z)^2} \quad \text{(equation 1)}$$

wherein S is an observed quantity, $(x_1, y_1, z_1)$ are the coordinates of the third electronic device, $(x, y, z)$ are the coordinates of the first electronic device, in which the coordinates of the third electronic device can be acquired from at least one parameter information while the coordinates $(x, y, z)$ of the first electronic device are unknown quantities. Under the ideal condition, the three unknown quantities $(x, y, z)$ maybe determined when the first electronic device and the third device, that is, the distances among three satellites, are measured.

Because the clock of the first electronic device may not be precise enough to be synchronized with the clock of the third electronic device, the propagation time in the air of the location signal transmitted by the third electronic device, as measured by the first electronic device, may not be accurate. Consequently, the calculated distance may not be accurate. It may be necessary to consider the time difference between the clock of the first electronic device and that of the third electronic device. Assuming the time difference is $\Delta t$, then the calculation formula in (equation 1) may be adjusted as:

$$S=\sqrt{(x_1-x)^2+(y_1-y)^2+(z_1-z)^2}+c\Delta t \quad \text{(equation 2)}$$

wherein c is a wave propagation velocity constant, $(x_1, y_1, z_1)$ are the known coordinates of the third electronic device, $(x, y, z)$ and $\Delta t$ are unknown quantities, wherein there are four unknown quantities in total. Therefore, in order to calculate the four unknown quantities, at least the first electronic device and the third electronic device (the distances among four satellites) may need to be measured so as to perform the positioning process to obtain the positional information of the first electronic device.

After step S303 is performed, the method may further comprise acquiring first map information; and acquiring a movement trajectory of the first electronic device based on the first map information and the at least one first positional information.

After the positional information of the first electronic device is obtained, map information needs to be obtained in order to generate the movement trajectory of the first electronic device. In the embodiments of the present application, the first map information may be stored in the second electronic device, and may also be the map information acquired from other electronic device by the second electronic device. Those skilled in the art may configure as desired and no limitation thereon is defined in the embodiments.

After at least one first positional information of the first electronic device and the corresponding map information are acquired, the acquired at least one first positional information may be identified in the first map (e.g., based on available software), so as to acquire the movement trajectory of the first electronic device.

Embodiment 3

Figure 4:
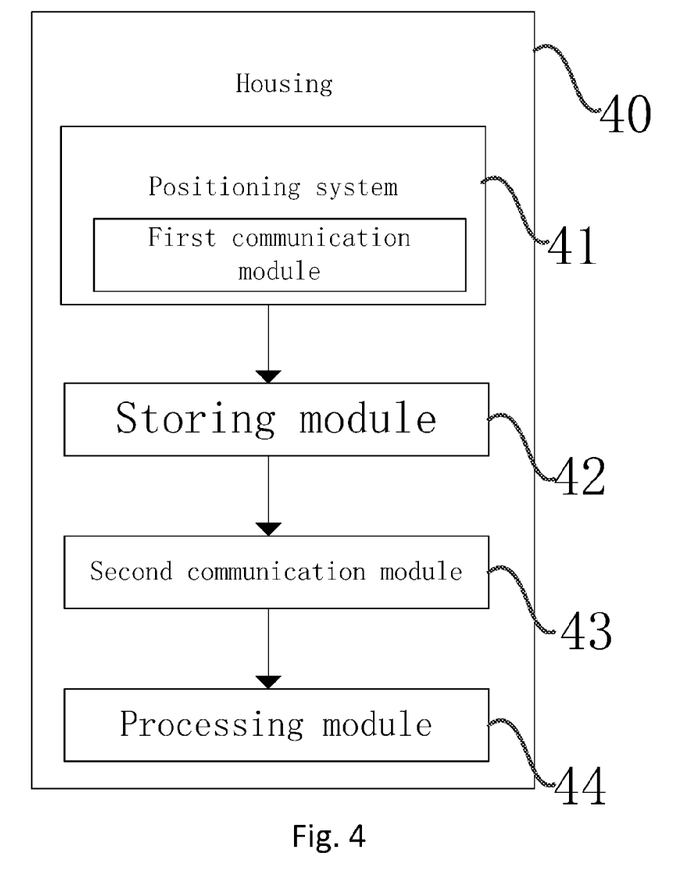
FIG. 4 is a structural diagram of an example electronic device according to an embodiment.

Referring now to FIG. 4, an embodiment further provides an electronic device, comprising: a housing 40; a positioning system 41, including a first communication module configured for receiving location signals; a storage module 42, configured for storing related information of the location signals; and a second communication module 43, configured for transmitting the related information to a second electronic device in communication with the first electronic device.

The electronic device may further comprise a processing module 44, configured for obtaining a first selection instruction for the electronic device to select an operation mode of the positioning system prior to receiving the location signals through the first communication module, wherein the operation mode includes a first operation mode and a second operation mode, and a first power consumption of the first operation mode is lower than a second power consumption of the second operation mode; and controlling the positioning system to be in the first operation mode in response to the first instruction.

The processing module 44 may be further configured for acquiring a remaining battery power value of the electronic device; determining whether the remaining battery power value is lower than a preset power value to obtain a first determination result; and, if the first determination result is positive, controlling the positioning system to be in the first operation mode.

The first communication module may be further configured for: receiving the location signals in real time; or receiving the location signals at a preset time interval.

Embodiments provide that the storage module 42 may be configured for storing every piece of related information of all the location signals received by the electronic device during movement. Accordingly, the second communication module may be configured for transmitting every piece of the related information to the second electronic device in communication with the electronic device when acquiring a first parameter indicating that a user of the electronic device ends the movement.

Embodiment 4

Figure 5:
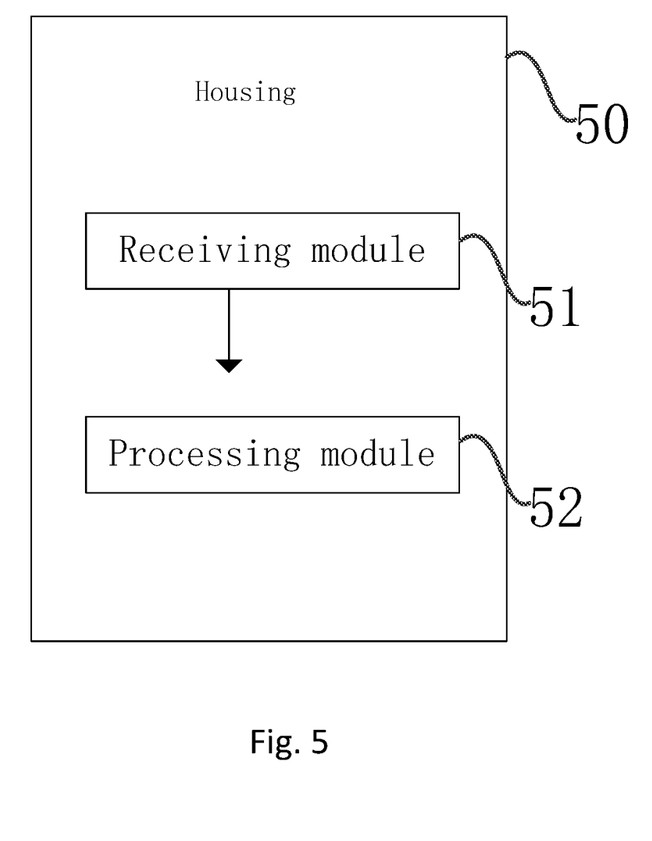
FIG. 5 is a structural diagram of an example electronic device according to an embodiment.

Referring now to FIG. 5. shown is example electronic device according to an embodiment, comprising: a housing 50; a receiving module 51, configured for receiving related information transmitted from a first electronic device, wherein the related information is related information of the location signals received by the first electronic device; and a processing module 52, configured for acquiring at least one parameter information of the position of the first electronic device based on the related information, and configured for acquiring at least one first positional information of the first electronic device based on the at least one parameter information.

Embodiments provide that the processing module 52 may be specifically configured for parsing the related information to acquire the at least one parameter information. The processing module 52 may be further configured to parse the related information and acquiring the positional information of the third electronic device from a fourth electronic device, different from the first electronic device, to acquire the at least one parameter information.

The processing module 52 may be further configured for acquiring first map information; and acquiring a movement trajectory of the second electronic device based on the first map information and the at least one first positional information.

Through one or more technical solutions of the embodiments, one or more of the following technical effects can be achieved.

A technical solution of the embodiments includes the location signals are received through the first communication module of the first electronic device; related information of the location signals is stored; and the related information is transmitted to a second electronic device communicatively connected to the first electronic device through a second communication module of the first electronic device. This is different from conventional techniques in which the operation sequence of the electronic device is receiving location signals, processing the received location signals to acquire the positional information of the user, and at last obtaining the movement trajectory of the electronic device, all performed by the electronic device, which results in the power of the electronic device being rapidly consumed. However, in the present technical solution, subsequent to receiving the location signals, the electronic device transmits related information of the location signals to a second electronic device for processing, thereby effectively solving the technical problem in the prior art of higher power consumption of the electronic device while acquiring movement trajectory, and achieving the technical effect of decreasing power consumption of the electronic device while acquiring movement trajectory.

A technical solution of the embodiments includes the location signals are received at a preset time interval through the first communication module. This is different from the conventional approaches in which the communication module of the electronic device needs to receive in real time the location signal to acquire the positional information of the electronic device that transmitted the location signals, in order to acquire the positional information of the electronic device. However in the present technical solutions, the electronic device receives the location signals at a preset time interval, that is, after receiving the signals for a time period, the electronic device can sleep for a time period during which the power consumption of the electronic device is lower, thereby to achieve the technical effect of further decreasing the power consumption of the electronic device.

A technical solution of the embodiments includes that every piece of related information of all the received location signals by the first electronic device during movement are stored. Accordingly, the transmitting the related information to a second electronic device communicatively connected to the first electronic device through a second communication module of the first electronic device comprises: when acquiring a first parameter indicating that a user of the first electronic device ends the movement, the first electronic device transmits every piece of the related information to a second electronic device communicatively connected to the first electronic device through a second communication module of the first electronic device. That is, in the present technical solution, after receiving the signals, the first electronic device will not transmit the received location signals to the second electronic device in real time. Instead, the first electronic device first stores all the received location signals, and then transmits every piece of related information of all the location signals in bulk to the second electronic device after the end of the movement, which reduces the transmission time, thereby achieving the technical effect of further decreasing the power consumption of the electronic device.

A technical solution of the embodiments includes that related information transmitted by the first electronic device is received, wherein the related information is the related information of the location signals received by the first electronic device; at least one parameter information of the position of the first electronic device is acquired based on the related information; and at least one first positional information of the first electronic device is acquired based on the at least one parameter information. This is different from conventional techniques in which the processing operation sequence to acquire the positional information of the first electronic device is performed by the first electronic device itself, which makes the first electronic device consume a lot of power. However, in the present technical solutions, the first electronic device receives the location signals, but it is the second electronic device that processes the received location signals, thereby the technical effect of decreasing the power consumption of the first electronic device is achieved.

Those skilled in the art should realize that an embodiment may be provided as a method, a system or a computer program product. Therefore, an embodiment may use forms including a full hardware embodiment, a full software embodiment, or an embodiment in combination of software and hardware aspects. Furthermore, an embodiment may include computer program products implemented on one or more computer storage media or device(s) (including, but not limited, to a magnetic disk memory, a CD-ROM, an optical memory or the like) which include a computer program code.

The example embodiments have been described with reference to flow diagrams and/or block diagrams. It should be understood that each flow and/or block in the flow diagrams and/or block diagrams and a combination thereof may be implemented by means of computer program instructions. These computer program instructions may be provided for a processor or processors of programmable data processing devices to generate a machine, so as to generate an apparatus configured to implement designated functions in one or more flows of a flow diagram and/or one or more blocks of a block diagram by instructions executed by a processor.

These computer program instructions may also be stored in a computer-readable memory or storage device that can guide a computer or other programmable data processing devices to work in a particular way, so that the instructions stored in the computer-readable memory generate a manufactured product including instructions that implement the designated functions in one or more flows of a flow diagram and/or one or more blocks of a block diagram. In the context of this document, a computer-readable memory or storage device is not a signal and "non-transitory" includes all media except signal media.

The computer program instructions may also be loaded on a computer or other programmable data processing devices to execute a series of operating steps on the computer or other programmable devices to produce a computer executed process, so that instructions executed on the computer or other programmable devices provide steps configured to implement designated functions in one or more flows of a flow diagram and/or one or more blocks of a block diagram.

Although example embodiments have been described, those skilled in the art may make additional alterations and modifications on these embodiments. Therefore, the appended claims are intended to be interpreted as covering example embodiments and all alterations and modifications falling within the ability of those having skill in the art.

It will be apparent to those skilled in the art that various modifications and variations can be made to the example embodiments without departing from the spirit and scope of the disclosure. In view of the foregoing, the non-limiting example embodiments are to be construed as covering modifications and variations thereof.

What is claimed is:

1. A method, comprising:
   a first electronic device receiving a location signal through a communication module of the first electronic device;
   the first electronic device storing information of said location signal;
   the first electronic device transmitting the information of said location signal to a second electronic device in communication with the first electronic device, so that the second electronic device can derive a location of the first electronic device based on the information of said location signal;
   the first electronic device receiving from the second electronic device, information comprising said location of the first electronic device, via the communication module of the first electronic device;
   the first electronic device displaying said location of the first electronic device; and
   the first electronic device determining a remaining power level of a power source of the first electronic device, wherein the first electronic device determining the remaining power level of the power source comprises:
   acquiring a remaining battery power value of the first electronic device;
   determining if the remaining battery power value is lower than a preset value; and
   responsive to a determination that the battery power value is lower than a preset value, placing the first electronic device into a low power consumption mode; and
   responsive to a determination that the battery power value is higher than the preset value, placing the first electronic device into a high power consumption mode;
   wherein the step of the first electronic device transmitting the information of said location signal to a second electronic device occurs only responsive to the determination that the battery power value is lower than the preset value.

2. The method of claim 1, wherein transmitting takes place in real time.

3. The method of claim 1, wherein the transmitting takes place during a preset time interval.

4. The method of claim 1, further comprising:
   storing the location signal received by the first electronic device during movement of the first electronic device.

5. The method of claim 4, wherein, in response to the first electronic device stopping, the first electronic device transmits the information to the second electronic device.

6. The method of claim 1, further comprising:
   acquiring map information; and
   using the map information to display said location of the first electronic device.

7. The method of claim 6, wherein the step of acquiring the map information comprises receiving the map information from a remote device.

8. An electronic device, comprising:
a housing;
a display device disposed within the housing;
a communication module disposed within the housing;
a processor operatively coupled to the display device and the communication module; and
a memory that stores instructions executable by the processor to:
receive a location signal through the communication module;
store information of said location signal;
transmit the information to a second electronic device;
receive from the second electronic device, information comprising said location of the first electronic device via the communication module;
display said location of the first electronic device via the display device; and
determine a remaining power level of a power source of the first electronic device, wherein the instructions executable by the processor to determine the remaining power level comprise:
acquiring a remaining battery power value of the first electronic device;
determining if the remaining battery power value is lower than a preset value; and
responsive to a determination that the battery power value is lower than a preset value, placing the first electronic device into a low power consumption mode; and
responsive to a determination that the battery power value is higher than the preset value, placing the first electronic device into a high power consumption mode;
wherein the instructions executable by the processor to transmit comprise instructions executable by the processor to transmit the information to the second electronic device responsive to the determination that the battery power value is lower than the preset value.

9. The electronic device of claim 8, wherein the processor executes instructions to transmit the information in real time.

10. The electronic device of claim 8, wherein the processor executes instructions to transmit the information during a preset time interval.

11. The electronic device of claim 8, wherein the processor executes instructions to:
store the location signal during movement of the electronic device.

12. The electronic device of claim 11, wherein, in response to the electronic device stopping, the processor transmits the information to the second electronic device.

13. The electronic device of claim 8, wherein the processor executes instructions to:
acquire map information; and
use the map information to display said location of the electronic device on the display device.

14. An electronic device, comprising:
a processor; and
a memory that stores instructions executable by the processor to:
receive positioning data from a mobile device;
process the positioning data to resolve a location of the mobile device;
transmit, to the mobile device, information comprising said location of the mobile device; and
determine a remaining power level of a power source of the mobile device, wherein the instructions executable by the processor to determine the remaining power level comprise:
acquiring a remaining battery value of the mobile device;
determining if the remaining battery power value is lower than a preset value; and
responsive to a determination that the battery power value is lower than a preset value, placing the mobile device into a low power consumption mode; and
responsive to a determination that the battery power value is higher than the preset value, placing the mobile device into a high power consumption mode;
wherein the instructions executable by the processor to receive comprise instructions executable by the processor to receive the information from the mobile device responsive to the determination that the battery power value is lower than the preset value.

* * * * *